(12) United States Patent
Xu et al.

(10) Patent No.: US 12,101,749 B2
(45) Date of Patent: Sep. 24, 2024

(54) CONTROL CHANNEL MONITORING CAPABILITY DETERMINING METHODS, USER EQUIPMENT AND NETWORK DEVICE

(71) Applicant: GUANGDONG OPPO MOBILE TELECOMMUNICATIONS CORP., LTD., Dongguan (CN)

(72) Inventors: Jing Xu, Dongguan (CN); Yanan Lin, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 414 days.

(21) Appl. No.: 17/711,813

(22) Filed: Apr. 1, 2022

(65) Prior Publication Data
US 2022/0225329 A1    Jul. 14, 2022

Related U.S. Application Data

(63) Continuation of application No. PCT/CN2019/109829, filed on Oct. 4, 2019.

(51) Int. Cl.
*H04W 72/0446* (2023.01)
*H04W 72/23* (2023.01)

(52) U.S. Cl.
CPC ....... *H04W 72/0446* (2013.01); *H04W 72/23* (2023.01)

(58) Field of Classification Search
CPC ............. H04W 72/0446; H04W 72/23; H04W 56/001; H04W 56/00; H04W 72/21; H04L 5/0058; H04L 5/0094; H04L 5/0053
See application file for complete search history.

(56) References Cited

U.S. PATENT DOCUMENTS

2013/0195043 A1    8/2013  Chen et al.
2020/0329389 A1*  10/2020  Hosseini ................ H04W 8/24

FOREIGN PATENT DOCUMENTS

| WO | 2011026383 A1 | 3/2011 | |
| WO | WO-2020198555 A1 * | 10/2020 | ............ H04W 24/08 |
| WO | WO-2021066198 A1 * | 4/2021 | ....... H04L 27/26025 |

OTHER PUBLICATIONS

International Search Report and Written Opinion dated Jul. 3, 2020 in International Application No. PCT/CN2019/109829. English translation attached.

(Continued)

*Primary Examiner* — Thai Nguyen
(74) *Attorney, Agent, or Firm* — Sheppard, Mullin, Richter & Hampton LLP

(57) ABSTRACT

The present disclosure discloses control channel monitoring capability determining methods, a User Equipment (UE) and a network device, applicable to a communication system. One of the methods is applied in a UE and includes: receiving a resource configuration of a Physical Downlink Control Channel (PDCCH); and determining, based on the resource configuration of the PDCCH, a first target PDCCH monitoring capability corresponding to a first span combination and a second target PDCCH monitoring capability corresponding to a second span combination. The first span combination and the second span combination are applicable to a same time domain unit, and the first target PDCCH monitoring capability and the second target PDCCH monitoring capability are independent from each other.

20 Claims, 3 Drawing Sheets

---

| Receiving a resource configuration of a PDCCH | 402 |

| Determining, based on the resource configuration of the PDCCH, a first target PDCCH monitoring capability corresponding to a first span combination and a second target PDCCH monitoring capability corresponding to a second span combination | 404 |

(56) References Cited

OTHER PUBLICATIONS

Spreadtrum Communications. "Discussion on PDCCH enhancements for URLLCc", 3GPP TSG RAN WG1 #98bis R1-1910027, Oct. 1, 2019, Section 2.2.1, 2.2.2, 8 pages.
Huawei. "Summary of 7.2.6.1 PDCCH enhancements", 3GPP TSG RAN WG1 Meeting #98 R1-1909827, Aug. 30, 2019, Aug. 30, 2019, Section 3.1.1, 60 pages.
Huawei. "Summary of 7.2.6.1 PDCCH enhancements", 3GPP TSG RAN WG1 Meeting #98 R1-1909736, Aug. 30, 2019, Aug. 30, 2019, Section 3.1.1, 57 pages.
Extended European Search Report dated Aug. 16, 2022 received in European Patent Application No. EP19947920.5.
Spreadtrum Communications: "Discussion on PDCCH enhancements for URLLCc" ,3GPP Draft; RI-1910027 , 3rd Generation Partnership Project (3GPP) , Mobile Competence Centre ; 650 , Route Des Lucioles ; F-06921 Sophia-Antipolis Cedex; France vol. RAN WG1 , no. Chongqing, China; Oct. 14, 2019-Oct. 20, 2019 Oct. 1, 2019 (Oct. 1, 2019) pp. 1-8, XP051788834.
Huawei et al: "PDCCH enhancements for URLLC" , 3GPP Draft; RI-1908051 , 3rd Generation Partnership Project (3GPP) , Mobile Competence Centre ; 650 , Route Des Lucioles ; F-06921 Sophia-Antipolis Cedex; France vol. RAN WG1 , no. Prague , Czech Republic;Aug. 26, 2019-Aug. 30, 2019, Aug. 17, 2019 (Aug. 17, 2019) , pp. 1-13,XP051764674.
Nokia et al: "On PDCCH Enhancements for NR URLLC" , 3GPP Draft; RI-1906751_NOKIA_EURLLC PDCCH 3GPP Draft; RI-1906751_NOKIA_EURLLC PDCCH ENH, 3rd Generation Partnership Project (3GPP) , Mobile Competence Centre ; 650 , Route Des Lucioles ; F-06921 Sophia-Antipolis Cedex ; France vol. RAN WG1 , no. Reno , Nevada, US; May 13, 2019-May 17, 2019,May 13, 2019 (May 13, 2019) , XP051728202 .

* cited by examiner

CONTROL CHANNEL MONITORING CAPABILITY DETERMINING METHODS, USER EQUIPMENT AND NETWORK DEVICE

CROSS-REFERENCE TO RELATED APPLICATION

The present application is a continuation of International Application No. PCT/CN2019/109829, filed on Oct. 4, 2019, which is incorporated herein by reference in its entirety.

TECHNICAL FIELD

The present disclosure relates to the field of mobile communication, and more particularly, to a processing solution for determining a downlink control channel monitoring capability.

BACKGROUND

The Third Generation Partnership Project (3GPP) has carried out research on a New Radio (NR) system.

In the NR system, a monitoring capability of a User Equipment (UE, a name for a mobile terminal in the 3GPP) for a Physical Downlink Control Channel (PDCCH) mainly includes a number of non-overlapped Control Channel Elements (CCEs) for channel estimation and a number of times of PDCCH blind detection.

It is an urgent problem to increase PDCCH monitoring opportunities and avoid a scheduling delay without significantly increasing complexity of the mobile terminal.

SUMMARY

Embodiments of the present disclosure provide control channel monitoring capability determining methods, a User Equipment (UE) and a network device. Technical solutions are provided as follows.

In a first aspect of the present disclosure, a control channel monitoring capability determining method applied in a UE is provided. The method includes: receiving a resource configuration of a PDCCH; and determining, based on the resource configuration of the PDCCH, a first target PDCCH monitoring capability corresponding to a first span combination and a second target PDCCH monitoring capability corresponding to a second span combination. The first span combination and the second span combination are applicable to a same time domain unit, and the first target PDCCH monitoring capability and the second target PDCCH monitoring capability are independent from each other.

In a second aspect of the present disclosure, a control channel monitoring capability determining method applied in a network device is provided. The method includes: transmitting a resource configuration of a PDCCH. The resource configuration of the PDCCH is used to determine a first target PDCCH monitoring capability corresponding to a first span combination and a second target PDCCH monitoring capability corresponding to a second span combination. The first span combination and the second span combination are applicable to a same time domain unit, and the first target PDCCH monitoring capability and the second target PDCCH monitoring capability are independent from each other.

In a third aspect of the present disclosure, a UE is provided. The UE includes a processor, a transceiver connected to the processor, and a memory for storing executable instructions of the processor. The processor is configured to load and execute the executable instructions to implement the control channel monitoring capability determining method as described above in the first aspect.

In a fourth aspect of the present disclosure, a network device is provided. The network device includes a processor, a transceiver connected to the processor, and a memory for storing executable instructions of the processor. The processor is configured to load and execute the executable instructions to implement the control channel monitoring capability determining method as described above in the second aspect.

BRIEF DESCRIPTION OF DRAWINGS

In order to clearly explain technical solutions of the embodiments of the present disclosure, drawings used in the description of the embodiments are briefly described below. Obviously, the drawings as described below are merely some embodiments of the present disclosure. Based on these drawings, other drawings can be obtained by those skilled in the art without creative effort.

DESCRIPTION OF EMBODIMENTS

In order to make the objects, technical solutions, and advantages of the present disclosure more apparent, embodiments of the present disclosure will be described in detail below with reference to the accompanying drawings.

A communication system and business scenarios described in the embodiments of the present disclosure are intended to more clearly describe, rather than limiting, the technical solutions of the embodiments of the present disclosure. It can be understood by those skilled in the art that, with the evolution of the communication system and emergence of new business scenarios, the technical solutions provided in the embodiments of the present disclosure are also applicable to similar technical problems.

Figure 1:
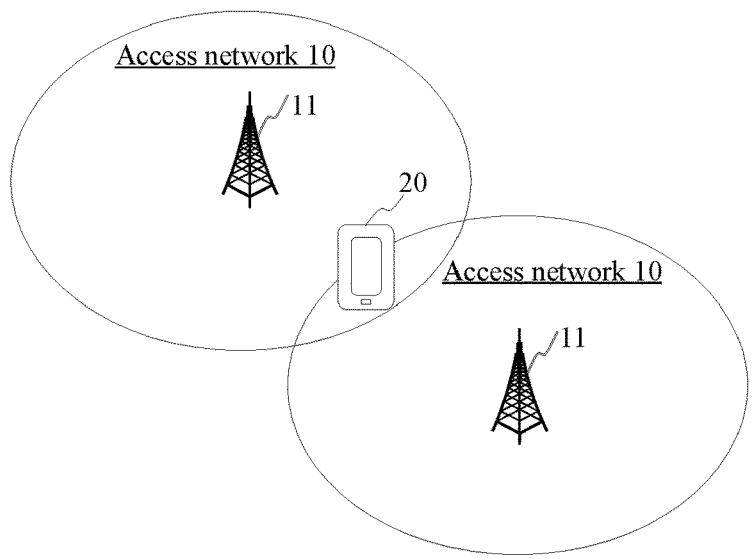
FIG. 1 is a block diagram showing a communication system according to an exemplary embodiment of the present disclosure.

FIG. 1 is a block diagram showing a communication system according to an exemplary embodiment of the present disclosure. As illustrated in FIG. 1, the communication system may include an access network 10 and a terminal 20.

The access network 10 includes several access network devices 11. The access network 10 may be called a New Generation-Radio Access Network (NG-RAN) in a 5th-Generation (5G) NR system. The access network device 11 may be a base station. The base station is an apparatus that is deployed in the access network 10 and provides a wireless communication function for the terminal 20. The base station 11 includes a macrocell, a microcell, a relay station, an access point, or the like in various forms. In systems using different wireless access technologies, names of a device functioning as a base station may be different. For example, in a Long Term Evolution (LTE) system, the device functioning as a base station can be referred to as evolved NodeB (eNB); and in a 5G NR system, the device functioning as a base station can be referred to as next generation NodeB (gNodeB or gNB). As communication technology develops, the term "base station" may change. For convenience, in the embodiments of the present disclosure, the apparatuses described above that provide wireless communication functions for the terminal 20 are collectively referred to as the access network devices.

Usually, there are a plurality of terminals 20, and one or more terminals 20 may be distributed in a cell managed by each access network device 11. The terminals 20 may include various handheld devices, vehicle-mounted devices, wearable devices, and computing devices with wireless communication functions or other processing devices connected to a wireless modem, as well as various forms of UEs, Mobile Stations (MSs), and the like. For the convenience of description, the devices mentioned above are collectively referred to as terminals. The access network device 11 and the terminal 20 communicate with each other through an over-the-air technology, such as via a Uu interface.

The "5G NR system" in the embodiments of the present disclosure may also be referred to as a 5G system or an NR system, the meaning of which can be understood by those skilled in the art however. The technical solutions described in the embodiments of the present disclosure may be applicable to the 5G NR system, and may also be applicable to subsequent evolution systems of the 5G NR system, and the embodiments of the present disclosure are not limiting in this regard.

A PDCCH monitoring capability includes a number of non-overlapped CCEs for channel estimation and a number of times of PDCCH blind detection. In the related art, the PDCCH monitoring capability is defined for a slot, as illustrated in Table 1 and Table 2 below.

TABLE 1

| $\mu$ | A maximum number $M_{PDCCH}^{max,\ slot,\ \mu}$ monitored PDCCH candidates in each serving cell |
|---|---|
| 0 | 44 |
| 1 | 36 |
| 2 | 22 |
| 3 | 20 |

In Table 1, the maximum number $M_{PDCCH}^{max,slot,\mu}$ of monitored PDCCH candidates per slot for a DownLink BandWidth Part (DL BWP) with a SCS configuration $\mu$ for a single serving cell is illustrated.

TABLE 2

| $\mu$ | A maximum number $C_{PDCCH}^{max,\ slot,\ \mu}$ of non-overlapped CCEs for channel estimation in each serving cell and slot |
|---|---|
| 0 | 56 |
| 1 | 56 |
| 2 | 48 |
| 3 | 32 |

In Table 2, the maximum number $C_{PDCCH}^{max,slot,\mu}$ of non-overlapped CCEs for channel estimation per slot for a DL BWP with the SCS configuration $\mu$ for a single serving cell is illustrated.

In the related art, the PDCCH monitoring capability for a slot does not restrict a uniform distribution of the PDCCH, and thus it is difficult for the UE's monitoring capability (numbers in the above two tables) to increase in one slot. However, if the PDCCH monitoring capability does not increase, a scheduling delay of URLLC may be increased. Therefore, the present disclosure introduces the PDCCH monitoring capability for a span, such that the PDCCH monitoring is uniformly distributed, and PDCCH monitoring opportunities can be increased and the scheduling delay of the URLLC can be avoided without significantly adding complexity to the terminal.

Figure 2:
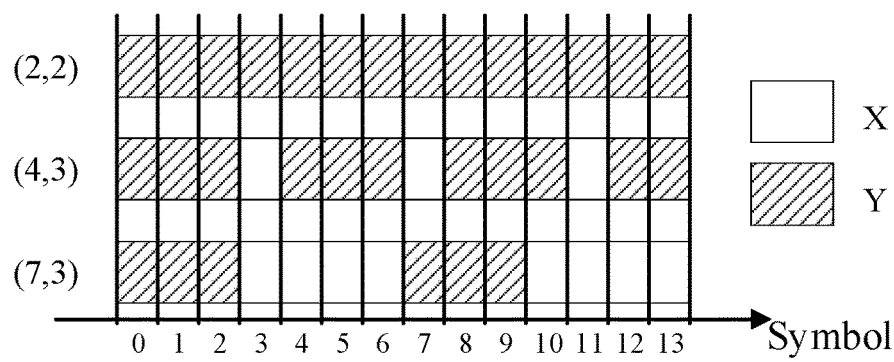
FIG. 2 is a schematic time-frequency diagram showing three typical span patterns in a slot.

A span pattern is a pattern used to define the PDCCH monitoring capability, and is determined based on a combination (X, Y). The span pattern is a pattern that is a periodical repetition of a single basic unit called a span pattern fragment. Here, X represents a distance between start symbols of two adjacent span pattern fragments, and Y represents a time domain range of the PDCCH in a span pattern fragment (counted from a beginning symbol in the span pattern fragment). FIG. 2 illustrates three typical span patterns (the present disclosure is not limited to the three typical span patterns). The three typical span patterns are a combination (2, 2), a combination (4, 3), and a combination (7, 3), respectively.

Each span pattern fragment in the combination (2, 2) occupies 2 symbols. In each span pattern fragment, 2 symbols are used as PDCCH monitoring positions. In a slot including 14 symbols numbered from 0 to 13, symbols 0 and 1 form a span pattern fragment, symbols 2 and 3 form a span pattern fragment, symbols 4 and 5 form a span pattern fragment, symbols 6 and 7 form a span pattern fragment, symbols 8 and 9 form a span pattern fragment, symbols 10 and 11 form a span pattern fragment, and symbols 12 and 13 form a span pattern fragment.

Each span pattern fragment in the combination (4, 3) occupies 4 symbols. In each span pattern fragment, 3 symbols are used as PDCCH monitoring positions. In a slot including 14 symbols numbered from 0 to 13, symbols 0, 1, 2, and 3 form a span pattern fragment, and symbols 0, 1, and 2 are PDCCH monitoring positions; symbols 4, 5, 6, and 7 form a span pattern fragment, and symbols 4, 5, and 6 are PDCCH monitoring positions; symbols 8, 9, 10, and 11 form a span pattern fragment, and symbols 8, 9, and 10 are PDCCH monitoring positions; and symbol 12 and symbol 13 form an incomplete span pattern fragment, and symbol 12 and symbol 13 are PDCCH monitoring positions.

Each span pattern fragment in the combination (7, 3) occupies 7 symbols. In each pattern fragment, 3 symbols are used as PDCCH monitoring positions. In a slot including 14 symbols numbered from 0 to 13, symbols 0, 1, 2, 3, 4, 5, and 6 form a span pattern fragment, and symbols 0, 1 and 2 are PDCCH monitoring positions; and symbols 7, 8, 9, 10, 11, 12, and 13 form a span pattern fragment, and symbols 7, 8, and 9 are PDCCH monitoring positions.

Here, the PDCCH monitoring capability under each combination can be characterized by the number of non-overlapped CCEs for channel estimation. The PDCCH monitoring capability corresponding to each span pattern is denoted as C, i.e., C(2,2), C(4,3) and C(7,3). Typical values of C(2,2), C(4,3) and C(7,3) are 16, 32, and 64, respectively. Here, 16 represents that a number of non-overlapped CCEs for channel estimation in a single span pattern fragment of (2, 2) is 16, 32 represents that a number of non-overlapped CCEs for channel estimation in a single span pattern fragment of (4, 3) is 32, and 64 represents that a number of non-overlapped CCEs for channel estimation in a single span pattern fragment of (7, 3) is 64. In at least one embodiment, the PDCCH monitoring capability further includes a number of times of blind detection.

Figure 3:
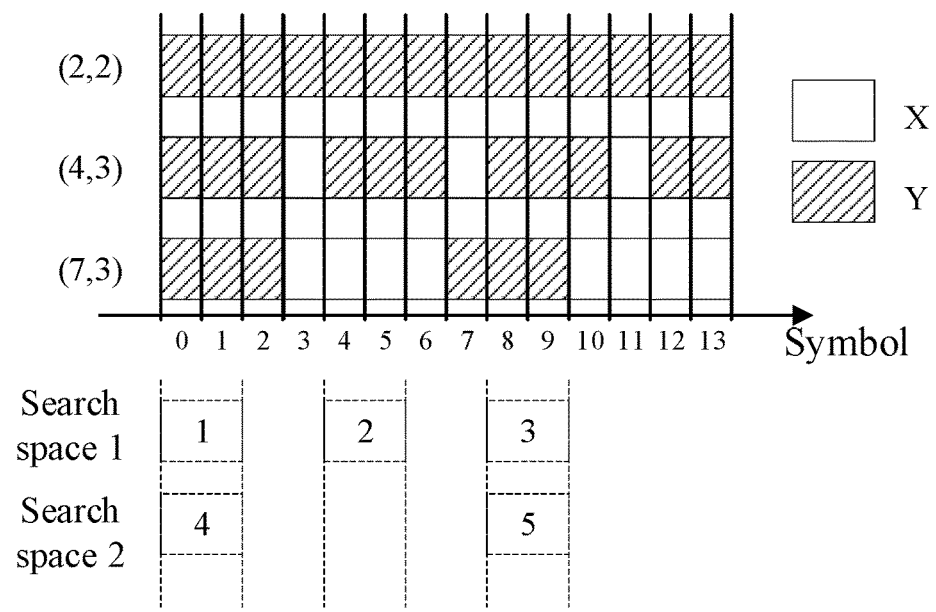
FIG. 3 is a schematic time-frequency diagram showing three typical span patterns in a slot in comparison with search spaces of a UE.

The UE reports the PDCCH capability it supports to the base station, but an actual resource configuration of the PDCCH is configured by the base station for the terminal. The PDCCH capability the UE supports and the actual resource configuration of the PDCCH are independent from each other. The resource configuration of the PDCCH includes a control resource set CORESET and a search space. Exemplarily, as illustrated in FIG. 3, the base station configures a search space 1 and a search space 2 for the UE. As can be seen from the search space 1 and the search space 2, PDCCH resources are not uniformly distributed and do not completely match each span pattern. Here, "match" means that time domain resource positions of a search space are a subset of PDCCH monitoring positions in a span pattern. "Completely match" means that the time domain resource positions of the search space are a subset of the PDCCH monitoring positions in each span pattern fragment of the span pattern.

For a span pattern corresponding to the combination (2, 2), a 1-st time domain resource position in the search space 1 conforms to a span pattern fragment 1 (including symbols 0 and 1), a 2-nd time domain resource position in the search space 1 conforms to a span pattern fragment 3 (including symbols 4 and 5), and a 3-rd time domain resource position in the search space 1 conforms to a span pattern fragment 5 (including symbols 8 and 9). A 4-th time domain resource position in the search space 2 conforms to the span pattern fragment 1 (including symbols 0 and 1), and a 5-th time domain resource position in the search space 2 conforms to the span pattern fragment 5 (including symbols 8 and 9).

For a span pattern corresponding to the combination (4, 3), the 1-st time domain resource position in the search space 1 conforms to a span pattern fragment 1 (including symbols 0, 1, 2, and 3), the 2-nd time domain resource position in the search space 1 conforms to a span pattern fragment 2 (including symbols 4, 5, 6, and 7), and the 3-rd time domain resource position in the search space 1 conforms to a span pattern fragment 3 (including symbols 8, 9, 10, and 11). The 4-th time domain resource position in the search space 2 conforms to the span pattern fragment 1 (including symbols 0, 1, 2, and 3), and the 5-th time domain resource position in the search space 2 conforms to the span pattern fragment 3 (including symbols 8, 9, 10, and 11).

For a span pattern corresponding to the combination (7, 3), the 1-st time domain resource position in the search space 1 conforms to a span pattern fragment 1 (including symbols 0, 1, 2, 3, 4, 5, and 6), but the 2-nd time domain resource position in the search space 1 does not conform to the span pattern fragment 1, and the 3-rd time domain resource position in the search space 1 conforms to a span pattern fragment 2 (including symbols 7, 8, 9, 10, 11, 12, and 13). The 4-th time domain resource position in the search space 2 conforms to the span pattern fragment 1 (including symbols 0, 1, 2, 3, 4, 5, and 6), and the 5-th time domain resource position in the search space 2 conforms to the span pattern fragment 2 (including symbols 7, 8, 9, 10, 11, 12, and 13).

For a given SCS (such as 15 kHz and 30 kHz), if the UE reports at least one supported combination C(X, Y), and if a plurality of combinations C(X, Y) are valid for a span pattern, the highest valid combination C should be applied.

1. A combination C(X, Y) is valid, if a span pattern conforms to X and Y of the given combination in each sequence.

2. Impact of empty span pattern(s) in the span pattern is for further study.

Based on the above conclusion, as illustrated in FIG. 3, when the UE reports a plurality of combinations of span patterns, e.g., when the combination (2, 2), the combination (4, 3), and the combination (7, 3) are reported, it is determined, for a slot, that combinations of span patterns that the resource configuration of the PDCCH conforms to are the combination (2, 2) and the combination (4, 3). Then, the highest C among them is determined as a target PDCCH monitoring capability of the terminal, i.e., C(4, 3)=32.

However, in such a manner of determination, an empty span pattern fragment may occur. For example, no PDCCH resource is configured on a span pattern fragment 4 (including symbols 12 and 13) in the combination (4, 3) illustrated in FIG. 3. As a result, the PDCCH monitoring capability of the UE is not fully used, and scheduling of other span pattern fragments is restricted due to a limitation of the PDCCH monitoring capability. Therefore, a problem caused by the empty span pattern fragment also needs to be solved.

It should be noted that the PDCCH monitoring capability of the UE includes at least a receiving capability of receiving wireless signals and a computing capability of blindly detecting the PDCCH from the wireless signals. Taking the span pattern fragment 1 of the combination (7, 3) as an example, the UE can receive wireless signals on symbols 0, 1 and 2 via a receiver, and blindly detect the PDCCH from the wireless signals on symbols 0, 1, 2, 3, 4, 5, and 6 via a processor, such that the computing capability on the empty span pattern fragment can be fully utilized.

Figure 4:
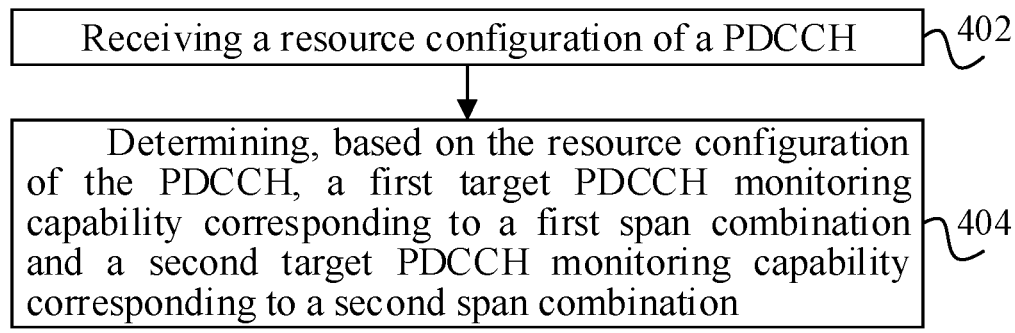
FIG. 4 is a flowchart illustrating a control channel monitoring capability determining method according to an exemplary embodiment of the present disclosure.

FIG. 4 is a flowchart illustrating a control channel monitoring capability determining method according to an exemplary embodiment of the present disclosure. The method can be applied to the communication system illustrated in FIG. 1. The method includes the following operations.

In block 402, a resource configuration of a PDCCH is received.

The UE receives the resource configuration of the PDCCH transmitted by the base station. For example, the resource configuration of the PDCCH is received in a System Information Block (SIB).

Optionally, the resource configuration of the PDCCH includes a control resource set CORESET configuration and a search space configuration. The resource configuration of the PDCCH is used to configure a PDCCH time domain resource position to the UE.

In block 404, a first target PDCCH monitoring capability corresponding to a first span combination and a second target PDCCH monitoring capability corresponding to a second span combination are determined based on the resource configuration of the PDCCH.

Here, the first span combination and the second span combination are applicable to a same time domain unit. In the present disclosure, the time domain unit includes, but is not limited to, at least one of a slot, a subframe, and a radio frame. The following description is made by taking the time domain unit being a "slot" as an example.

Optionally, the first span combination and the second span combination are span combinations supported by different time domain ranges (or sections) in the same time domain unit.

The UE supports at least two PDCCH monitoring capabilities. Here, the target PDCCH monitoring capability is related to the resource configuration of the PDCCH. Optionally, the target PDCCH monitoring capability is a highest or reasonable PDCCH monitoring capability selected by the UE based on the resource configuration of the PDCCH. The first target PDCCH monitoring capability and the second target PDCCH monitoring capability are independent from each other. That is, the first target PDCCH monitoring capability and the second target PDCCH monitoring capability may be the same or different.

In the present disclosure, a combination of span patterns is used to characterize the PDCCH monitoring capability.

Optionally, a span pattern is determined based on a combination (X, Y), where X represents a distance between start symbols of two adjacent span pattern fragments, and Y represents a time domain range of the PDCCH in the same span pattern fragment. The first span combination can be expressed as a combination (X1, Y1), and the second span combination can be expressed as a combination (X2, Y2).

Optionally, a pattern corresponding to the combination (X, Y) includes at least one of the combination (2, 2), the combination (4, 3), and the combination (7, 3). Exemplarily, a PDCCH monitoring capability corresponding to the combination (2, 2) includes a number 16 of times of blind detection, i.e., C(2, 2)=16; a PDCCH monitoring capability corresponding to the combination (4, 3) includes a number 32 of times of blind detection, i.e., C(4,3)=32; and a PDCCH monitoring capability corresponding to the combination (7,3) includes that a number 64 of times of blind detection, i.e., C(7,3)=64. Here, 16, 32, and 64 are exemplary values, and the present disclosure is not limiting in this regard.

Optionally, SCSs supported by the combination (X, Y) includes 15 kHz and 30 kHz. For a case where the SCSs include 60 kHz and 120 kHz, since an interval of each slot is short enough, such as 0.25 ms and 0.125 ms, the PDCCH monitoring capability based on a slot level can already meet requirements of the URLLC.

Optionally, the combination (X, Y) also includes at least one of a combination (2, 1), a combination (3, 1), a combination (3, 2), a combination (3, 3), a combination (4, 1), a combination (4, 2), a combination (7, 1), and a combination (7, 2). However, due to similar performance between some combinations, the combination (2, 2), the combination (4, 3), and the combination (7, 3) are used as examples for description in the present disclosure.

In summary, the method according to this embodiment provides PDCCH monitoring capabilities at a span level. The UE selects a highest or reasonable PDCCH monitoring capability based on the resource configuration of the PDCCH and at least two PDCCH monitoring capabilities supported by the UE, thereby giving full play to the PDCCH monitoring capability of the UE as much as possible without significantly increasing complexity of the UE.

The above embodiment can be carried out in at least two different implementations.

1. Span combinations are determined independently in different time domain ranges in the same time domain unit, and PDCCH monitoring capabilities corresponding to span combinations in respective time domain ranges are the same or different.

Typically, there are at least two span combinations which correspond to the same or different PDCCH monitoring capabilities.

2. Span combinations are determined uniformly in different time domain ranges in the same time domain unit. When an empty span pattern occurs, a PDCCH monitoring capability corresponding to an empty span combination is merged into a nearest non-empty span combination preceding or following the empty span combination.

For the First Implementation

The UE receives the resource configuration of the PDCCH transmitted by the base station, and determines a first PDCCH time domain resource position and a second PDCCH time domain resource position based on the resource configuration of the PDCCH. That is, both the first PDCCH time domain resource position and the second PDCCH time domain resource position are obtained based on the resource configuration of the PDCCH.

The first PDCCH time domain resource position conforms to a pattern corresponding to the first span combination, and the second PDCCH time domain resource position conforms to a pattern corresponding to the second span combination. Here, the first PDCCH time domain resource position and the second PDCCH time domain resource position do not overlap in time domain, and the first span combination and the second span combination are independent from each other.

Here, the first span combination is a span combination with a highest PDCCH monitoring capability in all span combinations that are capable of covering the first PDCCH time domain resource position, and the second span combination is a span combination with a highest PDCCH monitoring capability in all span combinations that are capable of covering the second PDCCH time domain resource position.

Figure 5:
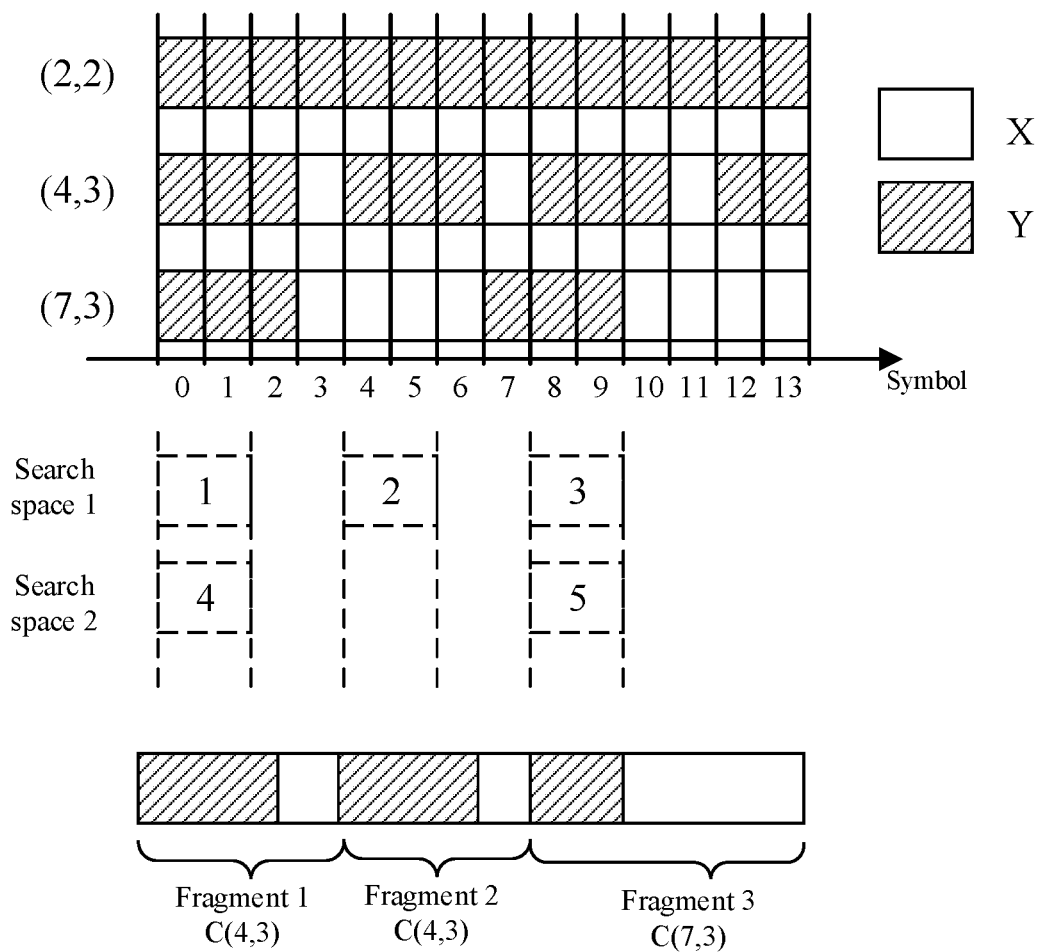
FIG. 5 is a schematic time-frequency diagram showing three typical span patterns in a slot in comparison with search spaces of a UE.

As an example, referring to FIG. 5, the UE receives the resource configuration of the PDCCH transmitted by the base station. For example, the resource configuration of the PDCCH is received in the SIB.

Optionally, the resource configuration of the PDCCH includes the control resource set CORESET configuration and the search space configuration. The resource configuration of the PDCCH is used to configure a PDCCH time domain resource position to the UE.

Figure 6:
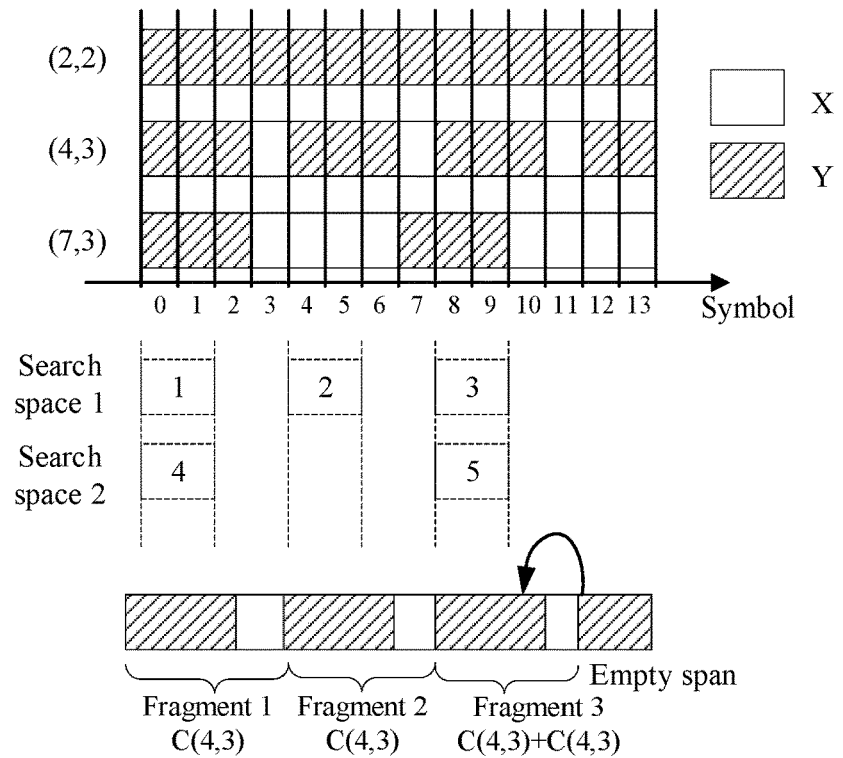
FIG. 6 is a schematic time-frequency diagram showing three typical span patterns in a slot in comparison with search spaces of a UE.

It is assumed that the resource configuration of the PDCCH includes the search space 1 and the search space 2, as illustrated in FIG. 6. The search space 1 includes a time domain resource position 1, a time domain resource position 2, and a time domain resource position 3 of the PDCCH. The search space 2 includes a time domain resource position 4 and a time domain resource position 5 of the PDCCH.

Here, the time domain resource position 1 and the time domain resource position 4 form a first group of time domain resource positions, the time domain resource position 2 forms a second group of time domain resource positions, and the time domain resource position 3 and the time domain resource position 5 form a third group of time domain resource positions. Each group of time domain resource positions includes one time domain resource position or a plurality of time domain resource positions that overlap in time domain. Time domain resource positions in different groups do not overlap each other in time domain.

Description is made by taking the first group of time domain resource positions and/or the second group of time domain resource positions as the "first PDCCH time domain resource position" and the third group of time domain resource positions as the "second PDCCH time domain resource position".

Suppose that the PDCCH monitoring capabilities supported by the terminal include C(2, 2), C(4, 3), and C(7, 3).

For the span pattern corresponding to the combination (2, 2), the 1-st time domain resource position in the search space 1 conforms to the span pattern fragment 1 (including symbols 0 and 1), the 2-nd time domain resource position in the search space 1 conforms to the span pattern fragment 3 (including symbols 4 and 5), and the 3-rd time domain resource position in the search space 1 conforms to the span pattern fragment 5 (including symbols 8 and 9). The 4-th time domain resource position in the search space 2 conforms to the span pattern fragment 1 (including symbols 0 and 1), and the 5-th time domain resource position in the search space 2 conforms to the span pattern fragment 5 (including symbols 8 and 9). Therefore, the span pattern fragments 1, 3, and 5 are available span pattern fragments.

For the span pattern corresponding to the combination (4, 3), the 1-st time domain resource position in the search space 1 conforms to the span pattern fragment 1 (including symbols 0, 1, 2, and 3), the 2-nd time domain resource position in the search space 1 conforms to the span pattern fragment 2 (including symbols 4, 5, 6, and 7), and the 3-rd time domain resource position in the search space 1 conforms to the span pattern fragment 3 (including symbols 8, 9, 10, and 11). The 4-th time domain resource position in the search space 2 conforms to the span pattern fragment 1 (including symbols 0, 1, 2, and 3), and the 5-th time domain resource position in the search space 2 conforms to the span pattern fragment 3 (including symbols 8, 9, 10, and 11). Therefore, the span pattern fragments 1, 2, and 3 are available span pattern fragments.

For the span pattern corresponding to the combination (7, 3), the 1-st time domain resource position in the search space 1 conforms to the span pattern fragment 1 (including symbols 0, 1, 2, 3, 4, 5, and 6), but the 2-nd time domain resource position in the search space 1 does not conform to the span pattern fragment 1, and the 3-rd time domain resource position in the search space 1 conforms to the span pattern fragment 2 (including symbols 7, 8, 9, 10, 11, 12, and 13). The 4th time domain resource position in the search space 2 conforms to the span pattern fragment 1 (including symbols 0, 1, 2, 3, 4, 5, and 6), and the 5-th time domain resource position in the search space 2 conforms to the span pattern fragment 2 (including symbols 7, 8, 9, 10, 11, 12, and 13). Therefore, the span pattern fragment 2 is an available span pattern fragment.

That is, available span pattern fragments in a single slot include:
1. the available span pattern fragments 1, 3, 5 in the combination (2, 2);
2. the available span pattern fragments 1, 2, 3 in the combination (4, 3); and
3. the available span pattern fragment 2 in the combination (7, 3).

For the available span pattern fragments in the single slot, in accordance with a chronological order in time domain, available span pattern fragments that overlap in time domain include the following.
1. The available span pattern fragment 1 in the combination (2, 2) and the available span pattern fragment 1 in the combination (4, 3) that overlap in time domain.
Since a PDCCH monitoring capability of the combination (4, 3) is higher than a PDCCH monitoring capability of the combination (2, 2), the combination (4, 3) is determined as the first span combination corresponding to the first group of time domain resource positions (the time domain resource positions 1 and 4).
2. The available span pattern fragment 3 in the combination (2, 2) and the available span pattern fragment 2 in the combination (4, 3) that overlap in time domain.
Since the PDCCH monitoring capability of the combination (4, 3) is higher than the PDCCH monitoring capability of the combination (2, 2), the combination (4, 3) is determined as the first span combination corresponding to the second group of time domain resource positions (the time domain resource position 2).

That is, the first span combination corresponding to the first PDCCH time domain resource position (the time domain resource positions 1, 2, and 4) is the combination (4, 3), and the first PDCCH monitoring capability is C(4, 3)=32.
3. The available span pattern fragment 5 in the combination (2, 2), the available span pattern fragment 3 in the combination (4, 3), and the available span pattern fragment 2 in the combination (7, 3) that overlap in time domain.
Since a PDCCH monitoring capability of the combination (7, 3) is higher than the PDCCH monitoring capabilities of the combinations (2, 2) and (4, 3), the combination (7, 3) is determined as the second span combination corresponding to the third group of time domain resource positions (the time domain resource positions 3 and 5).

That is, the second span combination corresponding to the second PDCCH time domain resource position (the time domain resource positions 3 and 5) is the combination (7, 3), and the second PDCCH monitoring capability is C(7, 3)=64.

It should be noted that, referring to FIG. 5, since a fragment 2 and a fragment 3 in a same slot overlap each other, the symbol 7 can be assigned to the fragment 2, or to the fragment 3. In this embodiment, as an example, the symbol 7 is assigned to the fragment 2, so as to ensure the PDCCH monitoring capability of the terminal in the fragment 2 as much as possible.

In summary, the method according to this embodiment provides PDCCH monitoring capabilities at a span level. The UE selects a highest or reasonable PDCCH monitoring capability based on the resource configuration of the PDCCH and at least two PDCCH monitoring capabilities supported by the UE, thereby giving full play to the PDCCH monitoring capability of the UE as much as possible without significantly increasing complexity of the UE.

Further, according to this embodiment, the highest PDCCH monitoring capabilities at a fragment level are used as the highest PDCCH monitoring capabilities for different time domain ranges (symbols) in a single slot, so as to give full play to the PDCCH monitoring capability of the UE as much as possible and effectively utilize the monitoring capability on the empty span pattern.

For the Second Implementation

The UE receives the resource configuration of the PDCCH transmitted by the base station, and determines at least one PDCCH time domain resource position based on the resource configuration of the PDCCH. That is, all the at least one PDCCH time domain resource position are obtained based on the resource configuration of the PDCCH.

(All) PDCCH time domain resource positions in the time domain unit conform to the patterns corresponding to the first span combination and the second span combination. The pattern corresponding to the first span combination is identical to the pattern corresponding to the second span combination, and the first target PDCCH monitoring capability corresponding to the first span combination and the second target PDCCH monitoring capability corresponding to the second span combination are independent from each other.

Optionally, when there are at least two candidate combinations for a same span combination to which all the PDCCH time domain resource positions in the time domain unit conform, a combination with the highest PDCCH monitoring capability is selected as the first span combination and the second span combination.

Optionally, the first target PDCCH monitoring capability corresponding to the first span combination is greater than or equal to a PDCCH monitoring capability corresponding to the first span combination; or the second target PDCCH monitoring capability corresponding to the second span combination is equal to zero 0.

Optionally, the first target PDCCH monitoring capability corresponding to the first span combination is equal to n times a PDCCH monitoring capability corresponding to the first span combination, where n is a non-negative number; or the second target PDCCH monitoring capability corresponding to the second span combination is equal to m times a PDCCH monitoring capability corresponding to the second span combination, where m is a non-negative number.

Optionally, when no PDCCH is configured in a time domain range corresponding to k combinations adjacent to the first span combination, n=k+1; or when no PDCCH is configured in a time domain range corresponding to the second span combination, m=0. Illustratively, the k combinations adjacent to the first span combination may be k adjacent combinations preceding the first span combination, or k adjacent combinations following the first span combination, or k adjacent combinations preceding and following the first span combination. The embodiments of the present disclosure are not limiting in this regard. Typically, the k combinations adjacent to the first span combination are the k adjacent combinations following the first span combination.

As an illustrative example, referring to FIG. 6, the UE receives the resource configuration of the PDCCH transmitted by the base station. For example, the resource configuration of the PDCCH is received in the SIB.

Optionally, the resource configuration of the PDCCH includes the control resource set CORESET configuration and the search space configuration. The resource configuration of the PDCCH is used to configure a PDCCH time domain resource position to the UE.

In an example, the resource configuration of the PDCCH includes the search space 1 and the search space 2, as illustrated in FIG. 6. The search space 1 includes a time domain resource position 1, the time domain resource position 2, and the time domain resource position 3 of the PDCCH. The search space 2 includes the time domain resource position 4 and the time domain resource position 5 of the PDCCH.

Here, the time domain resource position 1 and the time domain resource position 4 form the first group of time domain resource positions, the time domain resource position 2 forms the second group of time domain resource positions, and the time domain resource position 3 and the time domain resource position 5 form the third group of time domain resource positions. Each group of time domain resource positions includes one time domain resource position or a plurality of time domain resource positions that overlap in time domain. Time domain resource positions in different groups do not overlap each other in time domain.

Suppose that the PDCCH monitoring capabilities supported by the terminal include C(2, 2), C(4, 3), and C(7, 3).

For the span pattern corresponding to the combination (2, 2), the 1-st time domain resource position in the search space 1 conforms to the span pattern fragment 1 (including symbols 0 and 1), the 2-nd time domain resource position in the search space 1 conforms to the span pattern fragment 3 (including symbols 4 and 5), and the 3-rd time domain resource position in the search space 1 conforms to the span pattern fragment 5 (including symbols 8 and 9). The 4-th time domain resource position in the search space 2 conforms to the span pattern fragment 1 (including symbols 0 and 1), and the 5-th time domain resource position in the search space 2 conforms to the span pattern fragment 5 (including symbols 8 and 9). Therefore, the combination (2, 2) conforms to all the PDCCH time domain resource positions in a slot.

For the span pattern corresponding to the combination (4, 3), the 1-st time domain resource position in the search space 1 conforms to the span pattern fragment 1 (including symbols 0, 1, 2, and 3), the 2-nd time domain resource position in the search space 1 conforms to the span pattern fragment 2 (including symbols 4, 5, 6, and 7), and the 3-rd time domain resource position in the search space 1 conforms to the span pattern fragment 3 (including symbols 8, 9, 10, and 11). The 4-th time domain resource position in the search space 2 conforms to the span pattern fragment 1 (including symbols 0, 1, 2, and 3), and the 5-th time domain resource position in the search space 2 conforms to the span pattern fragment 3 (including symbols 8, 9, 10, and 11). Therefore, the combination (4, 3) conforms to all the PDCCH time domain resource positions in the slot.

For the span pattern corresponding to the combination (7, 3), the 1-st time domain resource position in the search space 1 conforms to the span pattern fragment 1 (including symbols 0, 1, 2, 3, 4, 5, and 6), but the 2-nd time domain resource position in the search space 1 does not conform to the span pattern fragment 1, and the 3-rd time domain resource position in the search space 1 conforms to the span pattern fragment 2 (including symbols 7, 8, 9, 10, 11, 12, and 13). The 4-th time domain resource position in the search space 2 conforms to the span pattern fragment 1 (including symbols 0, 1, 2, 3, 4, 5, and 6), and the 5-th time domain resource position in the search space 2 conforms to the span pattern fragment 2 (including symbols 7, 8, 9, 10, 11, 12, and 13). Therefore, the combination (7, 3) does not conform to all PDCCH time domain resource positions in the slot.

That is, combinations conforming to all the PDCCH time domain resource positions in the slot include: 1. the combination (2, 2); and 2. the combination (4, 3). Since the PDCCH monitoring capability of the combination (4, 3) is higher than that of the combination (2, 2), the PDCCH monitoring capability C(4, 3) of the combination (4, 3) is determined as the first PDCCH monitoring capability.

In a single slot, the combination (4, 3) includes four fragments: the span pattern fragment 1 (including symbols 0, 1, 2, and 3); the span pattern fragment 2 (including symbols 4, 5, 6, and 7); the span pattern fragment 3 (including symbols 8, 9, 10, and 11); and the span pattern fragment 4 (including symbols 12 and 13).

Here, the span pattern fragment 3 can be regarded as the "first span combination", and the span pattern fragment 4 can be regarded as the "second span combination". That is, the first span combination and the second span combination are span combinations which are conformed to on different time domain ranges (symbols) in the same slot.

For the span pattern fragment 1 or 2, since a next span pattern fragment of the span pattern fragment 1 or 2 is not an empty span pattern fragment, the PDCCH monitoring capability C(4, 3)=32 is determined as a target PDCCH monitoring capability corresponding to the span pattern fragment 1 or 2.

For the span pattern fragment 3, since a next span pattern fragment of the span pattern fragment 3 is an empty span pattern fragment, n=1+1=2, and thus 2*C(4, 3)=64 is determined as the first target PDCCH monitoring capability corresponding to the span pattern fragment 3.

For the span pattern fragment 4, since the span pattern fragment 4 is an empty span pattern fragment, m=0, and thus 0*C(4, 3)=0 is determined as the second target PDCCH monitoring capability corresponding to the span pattern fragment 4.

In summary, the method according to this embodiment provides PDCCH monitoring capabilities at a span level. The UE selects a highest or reasonable PDCCH monitoring capability based on the resource configuration of the PDCCH and at least two PDCCH monitoring capabilities supported by the UE, thereby giving full play to the PDCCH monitoring capability of the UE as much as possible without significantly increasing complexity of the UE.

Further, in this embodiment, the PDCCH monitoring capability on the empty span pattern fragment is merged into a nearest available span pattern fragment preceding the empty span pattern fragment, such that the PDCCH monitoring capability of the UE can be brought into full play as much as possible, and the monitoring capability on the empty span pattern can be effectively utilized.

It should be noted that the above method can be applied to the URLLC scenario.

It should be noted that the above terminal reports the first span combination and the second span combination to an access network device. The first span combination and the second span combination include at least one of a pattern corresponding to the first span combination, a PDCCH monitoring capability corresponding to the first span combination, a pattern corresponding to the second span combination, and a PDCCH monitoring capability corresponding to the second span combination.

Also, it should be noted that the base station may configure a plurality of search spaces for the UE, for example, 2 to 10 search spaces. The search space 1 and the search space 2 described above are exemplary only.

In an exemplary embodiment, a control channel monitoring capability determining method applied in a network device is provided. The control channel monitoring capability determining method applied in the network device corresponds to the above-described control channel monitoring capability determining method applied in the UE. Specifically, the the method includes transmitting a resource configuration of a PDCCH. The resource configuration of the PDCCH is used to determine a first target PDCCH monitoring capability corresponding to a first span combination and a second target PDCCH monitoring capability corresponding to a second span combination. The first span combination and the second span combination are applicable to a same time domain unit, and the first target PDCCH monitoring capability and the second target PDCCH monitoring capability are independent from each other.

For details of the control channel monitoring capability determining method applied in the network device, reference can be made to details given above for the control channel monitoring capability determining method applied in the UE. To avoid redundancy, no repetition is made here.

Figure 7:
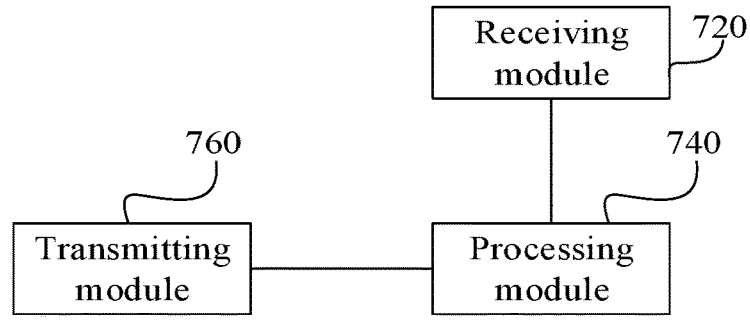
FIG. 7 is a block diagram showing a control channel monitoring capability determining apparatus according to an exemplary embodiment of the present disclosure.

FIG. 7 is a block diagram showing a control channel monitoring capability determining apparatus according to an exemplary embodiment of the present disclosure. The apparatus includes a receiving module 720, a processing module 740, and a transmitting module 760. The receiving module 720 is configured to implement functions related to reception operations in the above method. The processing module 740 is configured to implement functions related to determination operations and other operations (not reception/transmission) in the above method. The transmitting module 760 is configured to implement functions related to transmission operations in the above method.

The receiving module 720 is configured to receive a resource configuration of a PDCCH.

The processing module 740 is configured to determine, based on the resource configuration of the PDCCH, a first target PDCCH monitoring capability corresponding to a first span combination and a second target PDCCH monitoring capability corresponding to a second span combination.

Here, the first span combination and the second span combination are applicable to a same time domain unit, and the first target PDCCH monitoring capability and the second target PDCCH monitoring capability are independent from each other.

In a possible embodiment, a first PDCCH time domain resource position conforms to a pattern corresponding to the first span combination, and is obtained based on the resource configuration of the PDCCH; and a second PDCCH time domain resource position conforms to a pattern corresponding to the second span combination, and is obtained based on the resource configuration of the PDCCH.

Here, the first PDCCH time domain resource position and the second PDCCH time domain resource position do not overlap in time domain, and the first span combination and the second span combination are independent from each other.

In a possible embodiment, the first span combination is a span combination with a highest PDCCH monitoring capability in all span combinations that are capable of covering the first PDCCH time domain resource position; and the second span combination is a span combination with a highest PDCCH monitoring capability in all span combinations that are capable of covering the second PDCCH time domain resource position.

In a possible embodiment, a PDCCH time domain resource position in the time domain unit conforms to a pattern corresponding to the first span combination and a pattern corresponding to the second span combination, and is obtained based on the resource configuration of the PDCCH.

Here, the pattern corresponding to the first span combination is identical to the pattern corresponding to the second span combination, and the first target PDCCH monitoring capability corresponding to the first span combination and the second target PDCCH monitoring capability corresponding to the second span combination are independent from each other.

In a possible embodiment, the first target PDCCH monitoring capability corresponding to the first span combination is greater than or equal to a PDCCH monitoring capability corresponding to the first span combination; or the second target PDCCH monitoring capability corresponding to the second span combination is equal to 0.

In a possible embodiment, the first target PDCCH monitoring capability corresponding to the first span combination is equal to n times a PDCCH monitoring capability corresponding to the first span combination, where n is a non-negative number; or the second target PDCCH monitoring capability corresponding to the second span combination is equal to m times a PDCCH monitoring capability corresponding to the second span combination, where m is a non-negative number.

In a possible embodiment, when no PDCCH is configured in a time domain range corresponding to k combinations adjacent to the first span combination, n=k+1; or when no PDCCH is configured in a time domain range corresponding to the second span combination, m=0.

In a possible embodiment, the resource configuration of the PDCCH includes at least one of a control resource set CORESET configuration and a search space configuration.

In a possible embodiment, the apparatus further includes a transmitting module 760. The transmitting module 760 is configured to report the first span combination and the second span combination to an access network device. The first span combination and the second span combination include at least one of a pattern corresponding to the first span combination, a PDCCH monitoring capability corresponding to the first span combination, a pattern corresponding to the second span combination, and a PDCCH monitoring capability corresponding to the second span combination.

In a possible embodiment, a pattern corresponding to the first span combination is determined based on a span combination (X1, Y1), where X1 represents a distance between start symbols of two adjacent first span pattern fragments, and Y1 represents a time domain range of the PDCCH in each first span pattern fragment. A pattern corresponding to the second span combination is determined based on a span combination (X2, Y2), where X2 represents a distance between start symbols of two adjacent second span pattern fragments, and Y2 represents a time domain range of the PDCCH in each second span pattern fragment.

In a possible embodiment, a pattern corresponding to the span combination (X1, Y1) includes at least one of a span combination (2, 2), a span combination (4, 3), and a span combination (7, 3); and a pattern corresponding to the span combination (X2, Y2) includes at least one of a span combination (2, 2), a span combination (4, 3), and a span combination (7, 3).

In a possible embodiment, SCSs supported by the first span combination and the second span combination include 15 kHz and 30 kHz.

In a possible embodiment, a combination (X, Y) includes at least one of a combination (2, 1), a combination (3, 1), a combination (3, 2), a combination (3, 3), a combination (4, 1), a combination (4, 2), a combination (7, 1), and a combination (7, 2).

In a possible embodiment, the apparatus is applied to the URLLC scenario.

Figure 8:
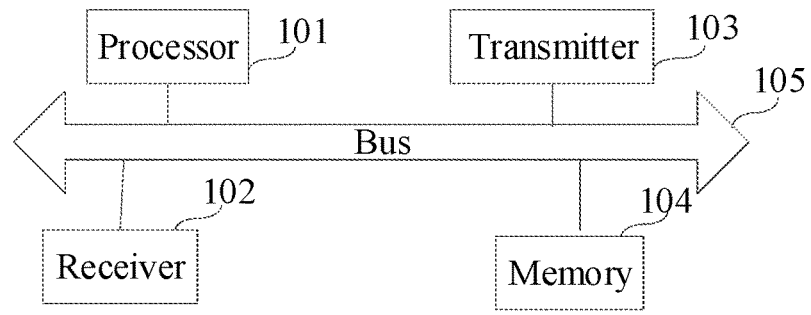
FIG. 8 is a block diagram showing a communication device according to an exemplary embodiment of the present disclosure.

FIG. 8 is a schematic block diagram of a communication device (a UE or an access network device) according to an exemplary embodiment of the present disclosure. The UE includes a processor 101, a receiver 102, a transmitter 103, a memory 104, and a bus 105.

The processor 101 includes one or more processing cores. The processor 101 executes various functional applications and information processing by running software programs and modules.

The receiver 102 and the transmitter 103 can be implemented as one communication component. The communication component can be a communication chip.

The memory 104 is connected to the processor 101 through the bus 105.

The memory 104 can be used to store at least one instruction. The processor 101 is configured to execute the at least one instruction, so as to implement each operation in the above method embodiments.

In addition, the memory 104 may be implemented by any type of volatile or non-volatile storage device or a combination thereof. The volatile or non-volatile storage device includes, but is not limited to, a magnetic disk or an optical disc, an Electrically Erasable Programmable Read-Only Memory (EEPROM), an Erasable Programmable Read-Only Memory (EPROM), a Static Random Access Memory (SRAM), a Read-Only Memory (ROM), a magnetic memory, a flash memory, a Programmable Read-Only Memory (PROM).

In an exemplary embodiment, a computer-readable storage medium is further provided. At least one instruction, at least one segment of a program, a set of codes, or a set of instructions is stored on the computer-readable storage medium. The at least one instruction, the at least one segment of the program, the set of codes, or the set of instructions is loaded and executed by the processor to implement the control channel monitoring capability determining method performed by a UE according to the method embodiments described above.

In an exemplary embodiment, a computer program product is further provided. At least one instruction, at least one segment of a program, a set of codes, or a set of instructions is stored on the computer program product. The at least one instruction, the at least one segment of the program, the set of codes, or the set of instructions is loaded and executed by the processor to implement the control channel monitoring capability determining method performed by a UE according to the method embodiments described above.

A person skilled in the art can understand that all or a part of the operations in the above embodiments can be implemented by hardware, or by relevant hardware instructed by a program. The program can be stored in a computer-readable storage medium. The above storage medium may be a read-only memory, a magnetic disk or an optical disc, etc.

The above are only embodiments of the present disclosure, and are not intended to limit the present disclosure. Any modification, equivalent replacement, improvement, etc. made within the spirit and principle of the present disclosure shall be included in the protection scope of the present disclosure.

What is claimed is:

1. A control channel monitoring capability determining method, applied in a User Equipment (UE), the method comprising:
    receiving a resource configuration of a Physical Downlink Control Channel (PDCCH); and
    determining, based on the resource configuration of the PDCCH, a first target PDCCH monitoring capability corresponding to a first span combination and a second target PDCCH monitoring capability corresponding to a second span combination,
    wherein the first span combination and the second span combination are applicable to a same time domain unit, and the first target PDCCH monitoring capability and the second target PDCCH monitoring capability are independent from each other.

2. The method according to claim 1, wherein a first PDCCH time domain resource position conforms to a pattern corresponding to the first span combination, and is obtained based on the resource configuration of the PDCCH; and a second PDCCH time domain resource position conforms to a pattern corresponding to the second span combination, and is obtained based on the resource configuration of the PDCCH,
wherein the first PDCCH time domain resource position and the second PDCCH time domain resource position do not overlap in time domain, and the first span combination and the second span combination are independent from each other,
wherein the first span combination is a span combination with a highest PDCCH monitoring capability in all span combinations that are capable of covering the first PDCCH time domain resource position; and
the second span combination is a span combination with a highest PDCCH monitoring capability in all span combinations that are capable of covering the second PDCCH time domain resource position.

3. The method according to claim 1, wherein a PDCCH time domain resource position in the time domain unit conforms to a pattern corresponding to the first span combination and/or a pattern corresponding to the second span combination, and is obtained based on the resource configuration of the PDCCH,
wherein the pattern corresponding to the first span combination is identical to the pattern corresponding to the second span combination, and the first target PDCCH monitoring capability corresponding to the first span combination and the second target PDCCH monitoring capability corresponding to the second span combination are independent from each other.

4. The method according to claim 3, wherein the first target PDCCH monitoring capability corresponding to the first span combination is greater than or equal to a PDCCH monitoring capability corresponding to the first span combination; or
the second target PDCCH monitoring capability corresponding to the second span combination is equal to 0.

5. The method according to claim 3, wherein the first target PDCCH monitoring capability corresponding to the first span combination is equal to n times a PDCCH monitoring capability corresponding to the first span combination, where n is a non-negative number; or
the second target PDCCH monitoring capability corresponding to the second span combination is equal to m times a PDCCH monitoring capability corresponding to the second span combination, where m is a non-negative number,
wherein when no PDCCH is configured in a time domain range corresponding to k combinations adjacent to the first span combination, n=k+1; or
when no PDCCH is configured in a time domain range corresponding to the second span combination, m=0.

6. The method according to claim 1, further comprising:
reporting the first span combination and the second span combination to an access network device, wherein the first span combination and the second span combination comprise at least one of a pattern corresponding to the first span combination, a PDCCH monitoring capability corresponding to the first span combination, a pattern corresponding to the second span combination, and a PDCCH monitoring capability corresponding to the second span combination.

7. The method according to claim 1, wherein a pattern corresponding to the first span combination is determined based on a span combination (X1, Y1), where X1 represents a distance between start symbols of two adjacent first span pattern fragments, and Y1 represents a time domain range of the PDCCH in each first span pattern fragment; and
a pattern corresponding to the second span combination is determined based on a span combination (X2, Y2), where X2 represents a distance between start symbols of two adjacent second span pattern fragments, and Y2 represents a time domain range of the PDCCH in each second span pattern fragment.

8. The method according to claim 7, wherein a pattern corresponding to the span combination (X1, Y1) comprises at least one of a span combination (2, 2), a span combination (4, 3), and a span combination (7, 3); and
a pattern corresponding to the span combination (X2, Y2) comprises at least one of a span combination (2, 2), a span combination (4, 3), and a span combination (7, 3),
wherein a PDCCH monitoring capability corresponding to the span combination (2, 2) comprises a number 16 of non-overlapped Control Channel Elements (CCEs) for channel estimation;
a PDCCH monitoring capability corresponding to the span combination (4, 3) comprises a number 32 of non-overlapped CCEs for channel estimation; and
a PDCCH monitoring capability corresponding to the span combination (7, 3) comprises a number 64 of non-overlapped CCEs for channel estimation.

9. The method according to claim 1, wherein the resource configuration of the PDCCH comprises at least one of a control resource set CORESET configuration and a search space configuration,
wherein Subcarrier Spacings (SCSs) supported by the first span combination and the second span combination comprise 15 kHz and 30 kHz.

10. A control channel monitoring capability determining method, applied in a network device, the method comprising:
transmitting a resource configuration of a Physical Downlink Control Channel (PDCCH),
wherein the resource configuration of the PDCCH is used to determine a first target PDCCH monitoring capability corresponding to a first span combination and a second target PDCCH monitoring capability corresponding to a second span combination,
wherein the first span combination and the second span combination are applicable to a same time domain unit, and the first target PDCCH monitoring capability and the second target PDCCH monitoring capability are independent from each other.

11. A User Equipment (UE), comprising:
a processor;
a transceiver connected to the processor; and
a memory for storing executable instructions of the processor,
wherein the processor is configured to load and execute the executable instructions to perform operations comprising:
receiving a resource configuration of a Physical Downlink Control Channel (PDCCH); and
determining, based on the resource configuration of the PDCCH, a first target PDCCH monitoring capability corresponding to a first span combination and a second target PDCCH monitoring capability corresponding to a second span combination,
wherein the first span combination and the second span combination are applicable to a same time domain unit, and the first target PDCCH monitoring capability and the second target PDCCH monitoring capability are independent from each other.

12. The UE according to claim 11, wherein a first PDCCH time domain resource position conforms to a pattern corresponding to the first span combination, and is obtained based on the resource configuration of the PDCCH; and
- a second PDCCH time domain resource position conforms to a pattern corresponding to the second span combination, and is obtained based on the resource configuration of the PDCCH,
- wherein the first PDCCH time domain resource position and the second PDCCH time domain resource position do not overlap in time domain, and the first span combination and the second span combination are independent from each other,
- wherein the first span combination is a span combination with a highest PDCCH monitoring capability in all span combinations that are capable of covering the first PDCCH time domain resource position; and
- the second span combination is a span combination with a highest PDCCH monitoring capability in all span combinations that are capable of covering the second PDCCH time domain resource position.

13. The UE according to claim 11, wherein a PDCCH time domain resource position in the time domain unit conforms to a pattern corresponding to the first span combination and/or a pattern corresponding to the second span combination, and is obtained based on the resource configuration of the PDCCH,
- wherein the pattern corresponding to the first span combination is identical to the pattern corresponding to the second span combination, and the first target PDCCH monitoring capability corresponding to the first span combination and the second target PDCCH monitoring capability corresponding to the second span combination are independent from each other.

14. The UE according to claim 13, wherein the first target PDCCH monitoring capability corresponding to the first span combination is greater than or equal to a PDCCH monitoring capability corresponding to the first span combination; or
- the second target PDCCH monitoring capability corresponding to the second span combination is equal to 0.

15. The UE according to claim 13, wherein the first target PDCCH monitoring capability corresponding to the first span combination is equal to n times a PDCCH monitoring capability corresponding to the first span combination, where n is a non-negative number; or
- the second target PDCCH monitoring capability corresponding to the second span combination is equal to m times a PDCCH monitoring capability corresponding to the second span combination, where m is a non-negative number,
- wherein when no PDCCH is configured in a time domain range corresponding to k combinations adjacent to the first span combination, n=k+1; or
- when no PDCCH is configured in a time domain range corresponding to the second span combination, m=0.

16. The UE according to claim 11, further comprising:
- reporting the first span combination and the second span combination to an access network device, wherein the first span combination and the second span combination comprise at least one of a pattern corresponding to the first span combination, a PDCCH monitoring capability corresponding to the first span combination, a pattern corresponding to the second span combination, and a PDCCH monitoring capability corresponding to the second span combination.

17. The UE according to claim 11, wherein a pattern corresponding to the first span combination is determined based on a span combination (X1, Y1), where X1 represents a distance between start symbols of two adjacent first span pattern fragments, and Y1 represents a time domain range of the PDCCH in each first span pattern fragment; and
- a pattern corresponding to the second span combination is determined based on a span combination (X2, Y2), where X2 represents a distance between start symbols of two adjacent second span pattern fragments, and Y2 represents a time domain range of the PDCCH in each second span pattern fragment.

18. The UE according to claim 17, wherein a pattern corresponding to the span combination (X1, Y1) comprises at least one of a span combination (2, 2), a span combination (4, 3), and a span combination (7, 3); and
- a pattern corresponding to the span combination (X2, Y2) comprises at least one of a span combination (2, 2), a span combination (4, 3), and a span combination (7, 3),
- wherein a PDCCH monitoring capability corresponding to the span combination (2, 2) comprises a number 16 of non-overlapped Control Channel Elements (CCEs) for channel estimation;
- a PDCCH monitoring capability corresponding to the span combination (4, 3) comprises a number 32 of non-overlapped CCEs for channel estimation; and
- a PDCCH monitoring capability corresponding to the span combination (7, 3) comprises a number 64 of non-overlapped CCEs for channel estimation.

19. The UE according to claim 11, wherein the resource configuration of the PDCCH comprises at least one of a control resource set CORESET configuration and a search space configuration,
- wherein Subcarrier Spacings (SCSs) supported by the first span combination and the second span combination comprise 15 kHz and 30 kHz.

20. A network device, comprising:
- a processor;
- a transceiver connected to the processor; and
- a memory for storing executable instructions of the processor,
- wherein the processor is configured to load and execute the executable instructions to implement the control channel monitoring capability determining method according to claim 10.

* * * * *